(12) United States Patent
Balagopal et al.

(10) Patent No.: US 10,916,819 B2
(45) Date of Patent: Feb. 9, 2021

(54) MULTI-STAGE SODIUM HEAT ENGINE FOR ELECTRICITY AND HEAT PRODUCTION

(71) Applicant: Enlighten Innovations Inc., Calgary (CA)

(72) Inventors: Shekar Balagopal, Sandy, UT (US); Ashok V. Joshi, Salt Lake City, UT (US); Sanil John, College Station, TX (US)

(73) Assignee: Enlighten Innovations Inc., Calgary (CA)

( * ) Notice: Subject to any disclaimer, the term of this patent is extended or adjusted under 35 U.S.C. 154(b) by 749 days.

(21) Appl. No.: 15/273,367

(22) Filed: Sep. 22, 2016

(65) Prior Publication Data

US 2017/0084970 A1    Mar. 23, 2017

Related U.S. Application Data

(60) Provisional application No. 62/222,064, filed on Sep. 22, 2015.

(51) Int. Cl.
*H01M 14/00* (2006.01)
*H01G 9/21* (2006.01)
*F01K 25/12* (2006.01)

(52) U.S. Cl.
CPC ............ *H01M 14/00* (2013.01); *F01K 25/12* (2013.01); *H01G 9/21* (2013.01); *F25B 2321/00* (2013.01); *H01M 2300/0074* (2013.01)

(58) Field of Classification Search
CPC ................... H01M 14/00; H01M 2300/0074
See application file for complete search history.

(56) References Cited

U.S. PATENT DOCUMENTS

| 5,085,948 A * | 2/1992 | Tsukamoto | H01M 10/3909 |
| | | | 429/11 |
| 5,441,575 A | 8/1995 | Underwood et al. | |
| 8,344,237 B1 | 1/2013 | Bennett | |
| 2013/0115483 A1 * | 5/2013 | Tucker | H01M 8/0271 |
| | | | 429/9 |

FOREIGN PATENT DOCUMENTS

WO    WO 2014/052439 A1 *    4/2014    ............ C01B 25/45

OTHER PUBLICATIONS

Feynman, et al., "The Feynman Lectures on Physics", Feynman Lectures on Physics, Jan. 1, 1963, 44-8.
Panitz, J., "International Search Report", PCT/US16/53133, dated Jan. 3, 2017, 1-6.
Panitz, J., "Written Opinion of the International Searching Authority", PCT/US16/53133, dated Jan. 3, 2017, 1-8.

(Continued)

*Primary Examiner* — Golam Mowla
(74) *Attorney, Agent, or Firm* — Foley & Lardner LLP (57) ABSTRACT

A multi-stage sodium heat engine is provided to convert thermal energy to electrical energy, the multi-stage sodium heat engine including at least a first stage, a second stage, and an electrical circuit operatively connecting the first stage and the second stage with an electrical load. One or more methods of powering an electrical load using a multi-stage sodium heat engine are also described.

32 Claims, 3 Drawing Sheets

(56) References Cited

OTHER PUBLICATIONS

Ryan, et al., "The alkali metal thermal-to-electric converter for solar system exploration", 18th International Conference on Thermoelectrics, Jan. 1, 1999, 630-638.
Vining, et al., "Reversible Thermodynamic Cycle for AMTEC Power Conversion", Aerospace Power. San Diego, Aug. 3-7, 1992; Proceedings of the Intersociety Energy Conversion Engineering Conference (IECED), New York, IEEE, US, vol. 3, Aug. 3, 1992, 3.123-3.127.
Communication pursuant to Article 94(3) EPC in EP 16782118.0 dated Jul. 25, 2019 (4 pages).
Feynman R P et al, "The Feynman Lectures on Physics", Feynman Lectures on Physics, Jan. 1963 (Jan. 1, 1963), p. 44.00-44.13, XP002949626.
International Search Report and Written Opinion in PCT/US2016/053133 dated Jan. 3, 2017 (11 pages).
Vining et al. "Reversible Thermodynamic Cycle for AMTEC Power Conversion" J. Electrochem. Soc.1993 vol. 140, issue 10, 2760-2763.

\* cited by examiner

MULTI-STAGE SODIUM HEAT ENGINE FOR ELECTRICITY AND HEAT PRODUCTION

RELATED APPLICATION

This application claims the benefit of U.S. Provisional Patent Application No. 62/222,064, titled: DUAL STAGE SODIUM HEAT ENGINE FOR ELECTRICITY AND HEAT PRODUCTION, filed Sep. 22, 2015, the entire disclosure of which is hereby incorporated by reference.

FIELD

One or more embodiments of the one or more present inventions relate, in general, to sodium heat engines to produce electricity from low cost heat sources, including solar energy, waste heat, and other forms of heat. More particularly, one or more embodiments described herein pertain to a multi-stage sodium heat engine, such as a dual-stage sodium heat engine.

BACKGROUND

Figure 1:
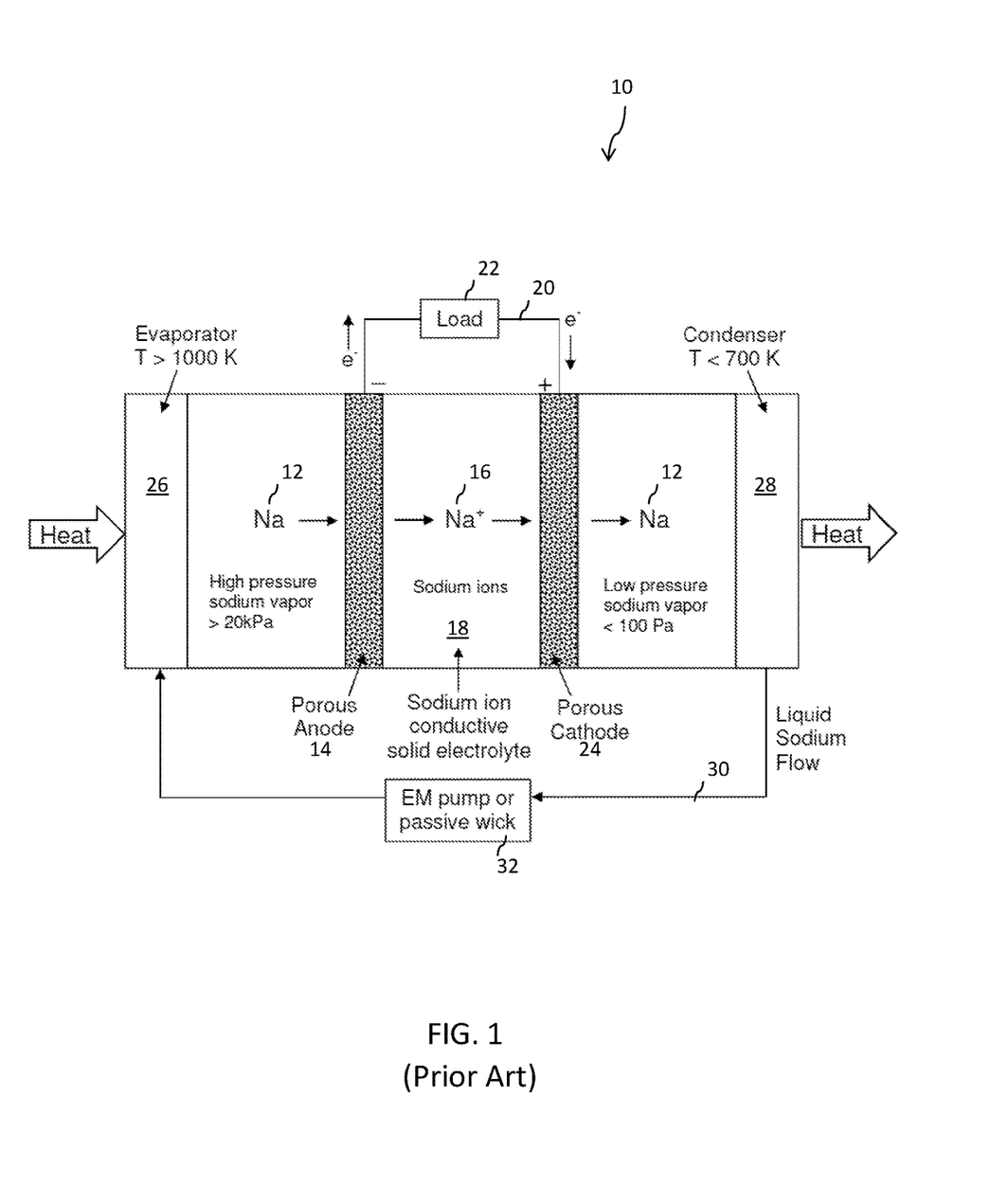
FIG. 1 illustrates a typical AMTEC system known in the prior art.

The Alkali Metal Thermal to Electric Converter (AMTEC) was developed approximately 50 years ago to directly convert thermal energy to electrical energy. A typical AMTEC system 10 is illustrated in FIG. 1. In a typical AMTEC system 10, an alkali metal, such as sodium 12, is transferred around a closed thermodynamic cycle. A porous anode 14 generates sodium-ions 16 which transport across a solid electrolyte 18, and electrons which travel from the anode 14 through an external circuit 20 to perform electrical work on load 22 to the low-pressure porous cathode 24, where they recombine with the sodium ions 16. In a typical AMTEC cycle, the sodium ion conduction between a high-pressure (or high-activity) region and a low-pressure (or low-activity) region through the sodium-ion conductive solid electrolyte 18 is thermodynamically nearly equivalent to an isothermal expansion of sodium vapor between the same high and low pressures.

As shown in FIG. 1, the AMTEC system 10 further includes an evaporator 26, typically at a temperature greater than about 1000K, to vaporize liquid sodium 30 to produce sodium vapor 12 and a condenser 28, typically at a temperature less than about 700K, to reduce temperature and reform the liquid sodium. The liquid sodium 30 is then returned to the evaporator 26 by an EM pump or passive wick 32.

In a typical AMTEC system 10, the sodium ion conductive solid electrolyte 18, which is a conductor of positive ions but an insulator to electrons, may be a β"-alumina solid electrolyte (BASE). At the side of the solid electrolyte 18 closer to the anode 14, heat is added to vaporize the sodium 12, resulting in a temperature greater than about 1000K and a pressure of over 20 kPa. At the side of the solid electrolyte closer to cathode 24, heat is removed to cool the sodium 12 to a temperature below 700K and a pressure less than 100 Pa. Despite being the "cold" side, the temperature is maintained at a relatively high temperature to maintain the sodium in liquid form.

At the anode 14 surface of the sodium ion conductive solid electrolyte 18, the sodium atoms 12 in the vapor are oxidized, which releases electrons to flow through external circuit 20, powering load 22. The resulting sodium ions 16 absorb the latent heat of vaporization. Due to the high pressure difference across the sodium ion conductive solid electrolyte 18 and its differential conductivity between electrons and sodium ions 16, the sodium ions 16 are transferred through the sodium ion conductive solid electrolyte 18 to the cathode 24, while the electrodes provide a conduction path for the free electrons to transfer across the external load 20 doing useful work on their way to the cathode 24 where they are recombined with the sodium ions 16 to form sodium vapor 12. At the cathode 24 side of the sodium ion conductive solid electrolyte 18, the sodium vapor 12 releases its latent heat of vaporization at the condenser 28 to form liquid (molten) sodium 30 which is transported back to the evaporator 26 by an electromagnetic pump or passive wick mechanism 32 to restart the cycle.

Typical multi-membrane β"-alumina AMTEC systems, which include parallel connection of multiple membranes in a system 10, may be operated at temperatures between about 1300 K on the hot side and 700 K on the cool side, with typical open circuit voltages of 0.7 V to 1.4 V for a single cell. While the Carnot engine efficiency limit for a 1300 K to 700 K operation is about 0.46, measured efficiencies have been reported in the range of 0.2-0.4 by Wu, S., et al. "A parabolic dish/AMTEC solar thermal power system and its performance evaluation," Applied Energy, 2010, 87, 452. Without wishing to be held to any particular theory, losses efficiency for typical AMTECs are believed to be related to Na leak due to compromised seal, ohmic contact losses, and electronic conduction in β"-alumina.

While β"-alumina phase transformation has been predicted and observed at temperatures above 1273 K, thermal degradation of β"-alumina above 1100 K has been attributed to reaction with vapor phase of Na and thermal breakdown at high temperatures.

Improvements in the foregoing are desired.

SUMMARY

The present disclosure provides a multi-stage sodium heat engine and methods of using the same.

It is to be understood that the one or more present inventions disclosed herein may include a variety of different versions or embodiments, and this Summary is not meant to be limiting or all-inclusive. This Summary provides some general descriptions of some of the embodiments, but may also include some more specific descriptions of other embodiments.

In one exemplary embodiment, a multi-stage sodium heat engine is provided. The sodium heat engine includes a first stage comprising a first porous anode and a first porous cathode separated by a first sodium conductive solid electrolyte, the first stage configured to provide expansion of a first stream of vaporized sodium from a pressure $P_4$ to a pressure $P_3$, where $P_4$ is greater than $P_3$, by ionizing the vaporized sodium to form sodium ions, the sodium ions being transferable through the first sodium conductive solid electrolyte, the first porous cathode reducing the sodium ions to form a second stream of vaporized sodium. The sodium heat engine further includes a second stage comprising a second porous anode and a second porous cathode separated by a second sodium conductive solid electrolyte. The second stage is operably connected to the first stage and configured to provide expansion of the second stream of vaporized sodium from a pressure $P_2$ to a pressure $P_1$, where $P_2$ is greater than $P_1$, by ionizing the vaporized sodium to form sodium ions, the sodium ions being transferrable through the second sodium conductive solid electrolyte, the second porous cathode reducing the sodium ions to form a third stream of vaporized sodium. The sodium heat engine further includes an electrical circuit operatively connecting the first porous anode and the second porous cathode with an electrical load.

In one more particular embodiment, the first sodium conductive solid electrolyte comprises a β"-alumina electrolyte, and more particularly comprises a sodium ion conductive solid electrolyte selected from the group consisting of: $(Na_2O)_{1-x}11Al_2O_3$ where x is from 0 to 0.75, more particularly from 0.10 to 0.75; $Na_{1.72}Al_{10.66}Li_{0.30}O_{17}$; and $Na_{1.67}(MgO)_{1.33}10.33\ Al_2O_3$. In a more particular embodiment, the sodium ion conductive solid electrolyte 12 has the formula $(Na_5LiAl_{32}O_{51})$, and even more particularly, comprises a sodium ion conductive solid electrolyte of the formula $Na_5LiAl_{32}O_{51}$.

In one more particular embodiment of any of the above embodiments, the second sodium conductive solid electrolyte comprises a material selected from the group consisting of: $Na_3Zr_2Si_2PO_{12}$; $Na_{1+x}Si_xZr_2P_{3-x}O_{12}$ where x is from 1.6 to 2.4; Y doped NaSICON of the formula $(Na_{1+x+y}Zr_{2-y}Y_ySi_xP_{3-x}O_{12}, Na_{1+x}Zr_{2-y}Y_ySi_xP_{3-x}O_{12-y})$ where x is 2 and y is 0.12; Fe-doped NaSICON of the formula $(Na_3Zr_{2/3}Fe_{4/3}P_3O_{12})$; $Na_5ReSi_4O_{12}$, wherein Re is selected from the group consisting of Y, Gd, Dy, and Nd; and $Na_4ZrSi_3O_{12}$, and even more particularly comprises a sodium ion conductive solid electrolyte of the formula $Na_4ZrSi_3O_{12}$. In another more particular embodiment, the second sodium conductive solid electrolyte comprises a β"-alumina electrolyte, and more particularly, a material selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

In one more particular embodiment of any of the above embodiments, the sodium heat engine further includes a heat source for providing a quantity of heat to the second stream of vaporized sodium between the first stage and the second stage.

In one more particular embodiment of any of the above embodiments, the sodium heat engine further includes a third stage comprising a third porous anode and a third porous cathode separated by a third sodium conductive solid electrolyte, the third stage operably connected to the second stage and configured to provide expansion of the third stream of vaporized sodium by ionizing the vaporized sodium to form sodium ions, the sodium ions being transferrable through the third sodium conductive solid electrolyte.

In one more particular embodiment of any of the above embodiments, the pressure $P_4$ is from about 160,000 Pa to about 10,000 Pa. In another more particular embodiment of any of the above embodiments, the first stage is configured to provide isothermal expansion of the vaporized sodium at a temperature of about 1100 K to about 1250 K. In another more particular embodiment of any of the above embodiments, the second stage is configured to provide isothermal expansion of the vaporized sodium at a temperature from about 850 K to about 400 K.

In one more particular embodiment of any of the above embodiments, the sodium heat engine further includes a vaporizer to vaporize a flow of molten sodium to form the first stream of vaporized sodium at the pressure $P_4$. In a more particular embodiment, the sodium heat engine further includes a heat source for providing a quantity of heat to the vaporizer, such as a concentrating solar power system. In another more particular embodiment, the sodium heat engine further includes a condenser to condense the third stream of vaporized sodium to form a molten stream of sodium. In an even more particular embodiment, the sodium heat engine further includes a pump or passive wick positioned between the condenser and the vaporizer, wherein the pump or passive wick allows for flow of molten sodium between the condenser and the vaporizer.

In one more particular embodiment of any of the above embodiments, the sodium heat engine has a Carnot efficiency of at least 0.5. In one another particular embodiment of any of the above embodiments, the sodium heat engine has an open-circuit electrochemical potential of at least 0.55 V.

In one exemplary embodiment, a method of powering an electrical load is provided. The method includes providing a first stream of sodium vapor; oxidizing the first stream of sodium vapor with a first anode to produce sodium ions and electrons and transporting the sodium ions across a first sodium conductive solid electrolyte; reducing the sodium ions with a first cathode to form a second stream of sodium vapor; oxidizing the second stream of sodium vapor with a second anode to produce sodium ions and electrons and transporting the sodium ions across a second sodium conductive solid electrolyte; and reducing the sodium ions with a second cathode to form a third stream of sodium vapor. The electrical load is part of an electronic circuit operatively connecting the first anode and the second cathode.

In one more particular embodiment, the first sodium conductive solid electrolyte comprises a β"-alumina electrolyte, and more particularly comprises a sodium ion conductive solid electrolyte selected from the group consisting of: $(Na_2O)_{1-x}11Al_2O_3$ where x is from 0 to 0.75, more particularly from 0.10 to 0.75; $Na_{1.72}Al_{10.66}Li_{0.30}O_{17}$; and $Na_{1.67}(MgO)_{1.33}10.33Al_2O_3$. In a more particular embodiment, the sodium ion conductive solid electrolyte 12 has the formula $(Na_5LiAl_{32}O_{51})$, and even more particularly, comprises a sodium ion conductive solid electrolyte of the formula $Na_5LiAl_{32}O_{51}$.

In another more particular embodiment, the second sodium conductive solid electrolyte comprises a material selected from the group consisting of: $Na_3Zr_2Si_2PO_{12}$; $Na_{1+x}Si_xZr_2P_{3-x}O_{12}$ where x is from 1.6 to 2.4; Y doped NaSICON of the formula $(Na_{1+x+y}Zr_{2-y}Y_ySi_xP_{3-x}O_{12}, Na_{1+x}Zr_{2-y}Y_ySi_xP_{3-x}O_{12-y})$ where x is 2 and y is 0.12; Fe-doped NaSICON of the formula $(Na_3Zr_{2/3}Fe_{4/3}P_3O_{12})$; $Na_5ReSi_4O_{12}$, wherein Re is selected from the group consisting of Y, Gd, Dy, and Nd; and $Na_4ZrSi_3O_{12}$, and even more particularly comprises a sodium ion conductive solid electrolyte of the formula $Na_4ZrSi_3O_{12}$. In another more particular embodiment, the second sodium conductive solid electrolyte comprises a β"-alumina electrolyte, and more particularly, a material selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

In one exemplary embodiment, a multi-stage sodium heat engine is provided. The multi-stage sodium heat engine includes a first stage comprising a first sodium conductive solid electrolyte, the first stage configured to provide expansion of a first stream of vaporized sodium by ionizing the vaporized sodium to form sodium ions, the sodium ions being transferable through the first sodium conductive solid electrolyte. In one more particular embodiment, the first sodium conductive solid electrolyte comprises a β"-alumina electrolyte, and more particularly comprises a sodium ion conductive solid electrolyte selected from the group consisting of: $(Na_2O)_{1-x}11Al_2O_3$ where x is from 0 to 0.75, more particularly from 0.10 to 0.75; $Na_{1.72}Al_{10.66}Li_{0.30}O_{17}$; and $Na_{1.67}(MgO)_{1.33}10.33Al_2O_3$. In a more particular embodiment, the sodium ion conductive solid electrolyte has the formula ($Na_5LiAl_{32}O_{51}$), and even more particularly, comprises a sodium ion conductive solid electrolyte of the formula $Na_5LiAl_{32}O_{51}$.

The multi-stage sodium heat engine also includes a second stage comprising a second sodium conductive solid electrolyte, the second stage configured to provide expansion of a second stream of vaporized sodium by ionizing the vaporized sodium to form sodium ions, the sodium ions being transferable through the second sodium conductive solid electrolyte. In one more particular embodiment, the second sodium conductive solid electrolyte comprises a material selected from the group consisting of: $Na_3Zr_2Si_2PO_{12}$; $Na_{1+x}Si_xZr_2P_{3-x}O_{12}$ where x is from 1.6 to 2.4; Y doped NaSICON of the formula ($Na_{1+x+y}Zr_{2-y}Y_ySi_xP_{3-x}O_{12}$, $Na_{1+x}Zr_{2-y}Y_ySi_xP_{3-x}O_{12-y}$) where x is 2 and y is 0.12; Fe-doped NaSICON of the formula ($Na_3Zr_{2/3}Fe_{4/3}P_3O_{12}$); $Na_5ReSi_4O_{12}$, wherein Re is selected from the group consisting of Y, Gd, Dy, and Nd; and $Na_4ZrSi_3O_{12}$, and even more particularly comprises a sodium ion conductive solid electrolyte of the formula $Na_4ZrSi_3O_{12}$. In another more particular embodiment, the second sodium conductive solid electrolyte comprises a β"-alumina electrolyte, and more particularly, a material selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

The multi-stage sodium heat engine further includes an electrical circuit operatively connecting the first stage and the second stage with an electrical load, wherein a Carnot efficiency of the multi-stage sodium heat engine is at least 0.5.

In a more particular embodiment of any of the above embodiments, the second stage receives the second stream of vaporized sodium from the first stage. In another more particular embodiment, the multi-stage sodium heat engine further includes a third stage comprising a third sodium conductive solid electrolyte, the third stage configured to provide expansion of a third stream of vaporized sodium by ionizing the vaporized sodium to form sodium ions, the sodium ions being transferable through the third sodium conductive solid electrolyte, wherein the electrical circuit operatively connects the first stage, the second stage, and the third stage with the electrical load.

Various components are referred to herein as "operably associated." As used herein, "operably associated" refers to components that are linked together in operable fashion, and encompasses embodiments in which components are linked directly, as well as embodiments in which additional components are placed between the two linked components.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

The present disclosure provides a multi-stage sodium heat engine and methods related thereto. For purpose of this disclosure, the description describes a dual-stage sodium heat engine; however, as described in additional detail below, it is to be understood that additional stages are encompassed by this disclosure.

Figure 2:
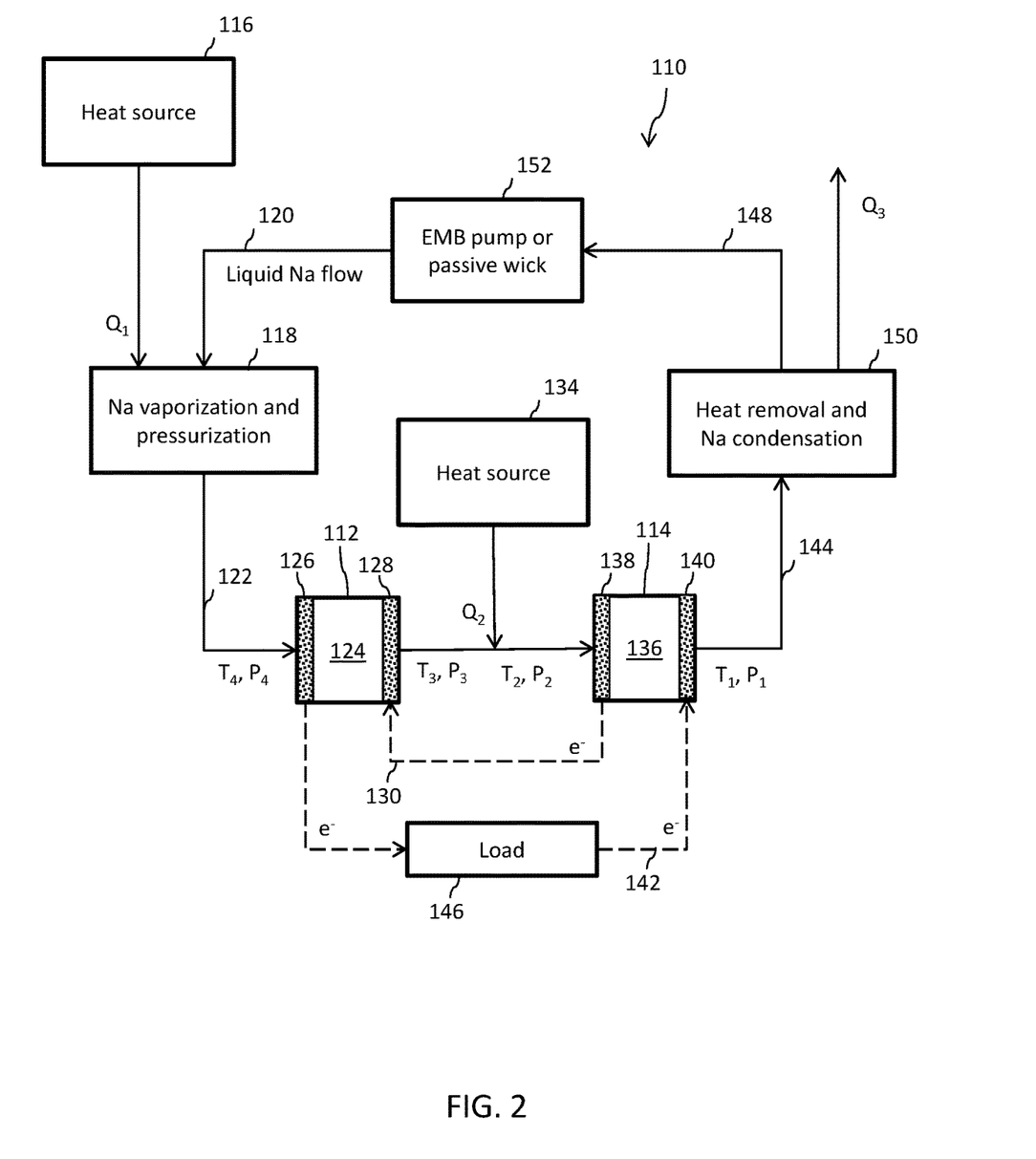
FIG. 2 illustrates an exemplary multi-stage sodium heat engine including a first stage and a second stage.

An exemplary dual-stage sodium heat engine 110 is illustrated in FIG. 2. The dual-stage sodium heat engine 110 includes a first stage 112 and a second stage 114. The first stage 112 illustratively operates at a relatively higher temperature range, while the second stage 114 illustratively operates at a relatively lower temperature range. Without wishing to be held to any particular theory, it is believed that the use of multiple stages allows for a more efficient utilization of heat around a wider temperature and up to 400° C. for conversion to electricity, particularly at lower temperatures in the second stage 114. In some more particular embodiments, the use of different first stage solid electrolytes 124 and second stage solid electrolytes 136 allow for selection of materials based on the different operating temperatures in the first stage 112 and second stage 114.

As shown in FIG. 2, a first quantity of heat $Q_1$ is supplied from a heat source 116, such as a concentrating solar power (CSP) system, to the evaporator 118, vaporizing liquid sodium 120 at temperature $T_1$ and pressure $P_1$ to form sodium vapor 122 at increased temperature $T_3$ and pressure $P_3$, where the pressure $P_3$ is the sodium vapor pressure at the given temperature $T_3$.

Referring to FIG. 2, the first stage 112 illustratively includes a sodium ion conductive solid electrolyte 124, a porous anode 126, and a porous cathode 128. Sodium vapor 122 at temperature $T_4$ and pressure $P_4$ enters the first stage 112. The first stage 112 includes the expansion of sodium 122 from pressure $P_4$ to pressure $P_3$ ($P_4>P_3$) from the transfer of sodium ions across the sodium ion conductive solid electrolyte 124, such as β"-alumina electrolyte, at high temperature $T_4$. At porous cathode 128, the sodium ions are rejoined to electrons from external circuit 130 to form sodium vapor 132 at temperature $T_3$ and pressure $P_3$.

In some exemplary embodiments, $T_4$ is about 1100 K to about 1250 K, $P_4$ is about 10,000 Pa to about 160,000 Pa, or more particularly $P_4$ is about 60,000 Pa to about 160,000 Pa, $T_3$ is from about 700K to about 850K, and $P_3$ is about 110 Pa to about 9000 Pa, or more particularly $P_3$ is about 110 Pa to about 2300 Pa. In a more particular embodiment, $T_4$ is about 1200 K and $P_4$ is about 150,000 Pa, and $T_3$ is about 850 K and $P_3$ is about 2300 Pa.

Exemplary first stage materials for sodium ion conductive solid electrolyte 124 include Beta Alumina (β-alumina and β"-alumina) electrolyte BASE materials having the formula $(Na_2O)_{1-x}11Al_2O_3$, where x is from 0 to 0.75, or more particularly from 0.10 to 0.75; $Na_{1.72}Al_{10.66}Li_{0.30}O_{17}$ (Jorgensen et al., 1981); or $Na_{1.67}(MgO)_{1.33}10.33Al_2O_3$ (Bourke et al., 1980). In a more particular embodiment, the sodium ion conductive solid electrolyte 12 has the formula ($Na_5LiAl_{32}O_{51}$). Suitable materials for the first stage sodium ion conductive solid electrolyte 124 include β-alumina electrolyte materials available from Ceramatec, Inc.

As shown in FIG. 2, a second quantity of heat $Q_2$ may optionally be added to the sodium vapor 132 between the first stage 112 and second stage 114. Referring to FIG. 2, the second quantity of heat $Q_2$ is illustratively provided by a heat source 134. In a more particular embodiment, the heat source 134 is also heat source 116, such as a concentrating solar power (CSP) system. The addition of the second quantity of heat $Q_2$ increases the temperature of the sodium vapor 132 from $T_3$ to $T_2$ and the pressure from $P_3$ to $P_2$. In other exemplary embodiments, no heat $Q_2$ is added and $T_3=T_2$ and $P_3=P_2$. In some exemplary embodiments, increasing the temperature and pressure of the sodium vapor 132 prior to the second stage 114 enhances the performance of the second stage 114.

Referring again to FIG. 2, the second stage 114 illustratively includes a sodium ion conductive solid electrolyte 136, a porous anode 138, and a porous cathode 140. Sodium vapor 132 at temperature $T_2$ and pressure $P_2$ enters the second stage 14. The second stage 114 includes the expansion of sodium 132 from pressure $P_2$ to pressure $P_1$ ($P_2>P_1$) from the transfer of sodium ions across the sodium ion conductive solid electrolyte 136, at temperature $T_2$. At porous cathode 140, the sodium ions are rejoined to electrons from external circuit 142 to form sodium 144 at temperature $T_1$ and pressure $P_1$.

In some exemplary embodiments, $T_2$ is about 700 K to about 850 K, $P_2$ is about 110 Pa to about 2330 Pa, $T_1$ is about 400 K to about 600 K, and $P_1$ is about 0.00020 Pa to about 5.7 Pa.

Exemplary second stage electrolyte materials for sodium ion conductive solid electrolyte 136 include Beta Alumina electrolyte BASE materials as described with respect to sodium ion conductive solid electrolyte 124 above, and NaSICON (Na Super Ion CONducting) sodium ion conductive solid electrolyte materials. NaSICON operation in molten sodium has been successfully demonstrated at 453 K for 1,000 hours at a current density of 100 mA/cm² for battery applications. Additionally, NaSICON has exhibited stability in molten sodium at 523 K that provides higher efficiency, cost savings, and wider temperature range for operation compared to conventional Alkali Metal Thermal to Elect Converters (AMTEC).

The NaSICON sodium ion conductive solid electrolyte material may comprise any known or novel NaSICON-type material that is suitable for use with the described sodium heat engine. Exemplary NaSICON materials are described in U.S. Pat. No. 8,246,863, the disclosures of which are hereby incorporated by reference in their entirety. Exemplary suitable examples of NaSICON-type compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12), Fe-doped NaSICON ($Na_3Zr_{2/3}Fe_{4/3}P_3O_{12}Na_5ReSi_4O_{12}$ (where Re is selected from Y, Gd, Dy, and Nd), and $Na_4ZrSi_3O_{12}$. Suitable materials for the second stage sodium ion conductive solid electrolyte 136 NaSelect™ solid-electrolyte materials available from Ceramatec, Inc.

Figure 3:
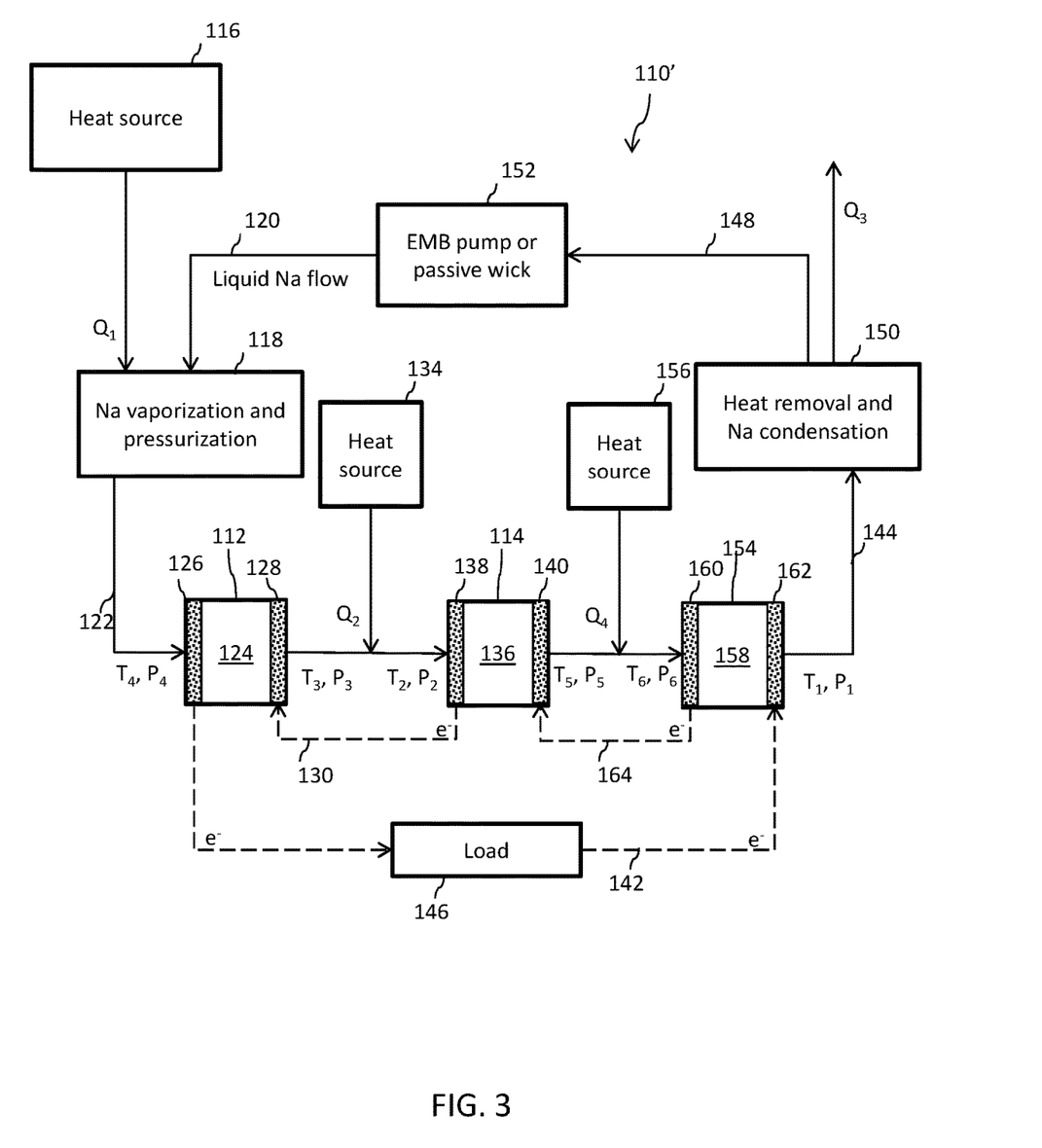
FIG. 3 illustrates an exemplary multi-stage sodium heat engine including three stages.

As mentioned above, although the exemplary dual-stage sodium heat engine 110 in FIG. 2 is illustrated as comprising a first stage 112 and a second stage 114, in other embodiments, a multi-stage sodium heat engine may include more than two stages. For example, FIG. 3 illustrates an exemplary dual stage sodium heat engine 110' including a first stage 112, a second stage 114, and a third stage 154. In other embodiments (not shown), a multi-stage sodium heat engine may include additional stages, such as a fourth stage, a fifth stage, a sixth stage, etc., in a manner similar to the inclusion of a third stage 154 to the exemplary sodium heat engine 110' illustrated in FIG. 3.

As illustrated in FIG. 3, an optional fourth quantity of heat $Q_4$ is illustratively provided by a heat source 156. In a more particular embodiment, the heat source 156 is also heat source 116 and/or heat source 134, such as a concentrating solar power (CSP) system. The addition of the second quantity of heat $Q_2$ increases the temperature of the sodium vapor exiting second stage 114 from $T_5$ to $T_6$ and the pressure of the sodium vapor exiting second stage 114 from $P_5$ to $P_6$. The third stage 154 illustratively includes a sodium ion conductive solid electrolyte 158, a porous anode 160, and a porous cathode 162. Third stage 154 illustratively includes a solid sodium ion conductive solid electrolyte material 158, which may be formed from the same or different material than solid electrolyte material 124 and/or solid electrolyte material 136. Sodium vapor exiting the second stage 136 enters the third 154 stage. The third stage 154 includes the isothermal expansion of sodium vapor from to pressure $P_1$ by sodium ion transfer through the sodium ion conductive solid electrolyte 158, while electrons are removed by external circuit 164 to porous anode 140 of the second stage 114. At porous cathode 162, the sodium ions are rejoined to electrons from external circuit 142 to form sodium 144 at temperature $T_1$ and pressure $P_1$.

Referring again to FIG. 2, the sodium 144 is condensed to liquid sodium 148 by condenser 150, releasing the quantity of heat $Q_3$. Heat removal ($Q_3$) by a condenser occurs at a low temperature $T_1$, where $T_1$ is sufficient to cause condensation of sodium vapor to molten sodium. In some embodiments, the heat removal ($Q_3$) provides thermal energy for preheating transfer fluid for the concentrating solar power (CSP) system or for low temperature industrial applications. In one embodiment, the temperature $T_1$ is as low as about 370 K, about 400 K, about 425 K, as high as about 450 K, about 500 K, about 525 K, or within any range defined between any two of the foregoing values, such as between about 370 K and about 525 K, or between about 400 K to about 450 K, for example.

The liquid sodium 148 is illustratively transported back to the evaporator 118 by a pump or passive wick mechanism 152.

Referring again to FIG. 2, electrical load 146 is illustratively powered between the porous anode 126 of the high pressure chamber of first stage 112 and the cathode of the low pressure chamber of the second stage 114. The porous cathode 128 of first stage 112 and the anode of second stage 114 electrically connected to complete the circuit 130, 142 through electrical load 146.

The β"-alumina electrolyte materials for sodium ion conductive solid electrolyte 124 of the first stage 112 is suitable for typical operation at temperatures from about 1150 K and about 800 K. The NaSICON materials for sodium ion conductive solid electrolyte 136 of the second stage 114 is suitable for operation at typical temperatures of about 800 K and lower. The β"-alumina materials for sodium ion conductive solid electrolyte 136 of the second stage 114 is also suitable for operation at typical temperatures of about 800 K and lower. Thus, a multi-stage sodium heat engine, including a dual-stage sodium heat engine, is able to operate at a broader temperature range compared to conventional AMTEC devices. In addition, the first stage 112 of a multi-stage sodium heat engine, including a dual-stage sodium heat engine 110, is able to operate at an upper temperature that is sufficiently low to maintain the stability and useful life of the β"-alumina solid electrolyte.

In some exemplary embodiments, the dual-stage sodium heat engine 110 provides improved overall efficiency of CSP-based hybrid solar energy converters and inexpensively generates both heat and electricity. Suitable materials for fabricating the dual-stage sodium heat engine include ceramic coated stainless steel or alumina and other suitable materials thermally and chemically resistant to molten and vapor phase sodium. In some embodiments, a high temperature glass seal between the solid electrolytes and various components of the dual-stage sodium heat engine 110 is provided to enable leak tight operation of the dual-stage sodium heat engine 110.

Theoretical Carnot Efficiency

Theoretical calculations show that a multi-stage sodium heat engine can provide a higher theoretical efficiency compared to a typical AMTEC single-stage engine.

Table 1 shows the Carnot efficiency ($\eta$) and the open-circuit electrochemical potential ($V^{OC}$) for the dual-stage sodium heat engine at various $T_1$ values and a constant $T_2$ value of 1153 K as given by Nernst equation, $V^{OC}=R*(T_2-T_1)*\ln(P_2/P_1)/(n*F)$. Here, n is the number of electrons (1) in Na oxidation and reduction reactions, R is the universal gas constant (8.314 J·mol$^{-1}$·K$^{-1}$), and F is the Faraday's constant (96,485 C·mol$^{-1}$).

In the disclosed heat engine, heat is supplied by solar concentration, and sodium is the working fluid to drive the electrochemical unit that generates electricity.

For the determination of Carnot efficiencies below, a dual-stage sodium heat engine was modeled as shown in FIG. 2. The overall efficiency was determined by combining the efficiencies determined for each stage separately. The first stage solid electrolyte 124 was β"-alumina with an isothermal expansion temperature $T_3$ of 1153 K. The second stage solid electrolyte 136 was NaSICON with an isothermal expansion temperature $T_1$ as indicated in Table 1. The corresponding sodium vapor pressures $P_3$ for a $T_3$ of 1153 is 100,000 Pa, and the sodium vapor pressure $P_1$ for each temperature $T_1$ is shown in Table 1. In some exemplary embodiments, the NaSICON temperature $T_1$ provides a sufficiently high vapor pressure for sodium mass transfer, as well as a high thermal driving force for a large Nernst potential.

TABLE 1

$V^{OC}$ and $\eta$ values at various $T_1$ temperatures

| $T_1$ (K) | $P_1$ (Pa) | $V^{OC}$ (V) | $\eta$ |
|---|---|---|---|
| 371 | 1.65*10$^{-5}$ | 1.36 | 0.68 |
| 421 | 8.67*10$^{-4}$ | 1.02 | 0.63 |
| 471 | 1.97*10$^{-2}$ | 0.77 | 0.59 |
| 523 | 2.69*10$^{-1}$ | 0.57 | 0.55 |

As shown in Table 1, a dual-stage sodium heat engine 110 as illustrated in FIG. 2 can provide a theoretical efficiency of about 0.68, compared to a reported theoretical efficiency of only 0.46 for an AMTEC single-stage engine. The ideal thermodynamic cycle efficiency is >95% of Carnot with thermal, ohmic and other resistances at operating temperature a practical efficiency of around 80% of the ideal cycle efficiency at an overall efficiency of >40% can be realized.

Without wishing to be held to any particular theory, it is believed that the use of different solid electrolytes in the first and second stages, such as the use of β"-alumina in the first stage and NaSICON in the second stage, provides a large driving force in the form of the greater temperature difference enabling high open-circuit electrochemical potential. Low temperature NaSICON operation allows reduction in high temperature $T_3$ to limit β"-alumina thermal degradation, yet maintain high thermal driving force and high Carnot efficiency. Further, NaSICON provides higher conductivity than β"-alumina conductivity at lower temperatures. In some exemplary embodiments, the dual-stage sodium heat engine will achieve current density of 100-200 mA/cm$^2$ at 1 V and thermal-to-electric conversion efficiency of 0.45.

In one embodiment, the Carnot efficiency for the dual-stage sodium heat engine is as little as 0.5, 0.55, 0.6, as high as 0.63, 0.65, 0.68, 0.7 or within any range defined between any two of the foregoing values, such as between 0.5 and 0.7, 0.55 and 0.68, or 0.6 and 0.68, for example. In one embodiment, the $V^{OC}$ for the dual-stage sodium heat engine is as little as 0.55 V, 0.57 V, 0.6 V, 0.75 V, as high as 1.0 V, 1.1 V, 1.2 V, 1.3 V, 1.4 V, 1.5 V, or within any range defined between any two of the foregoing values, such as between 0.5 V and 1.5 V, between 0.55 and 1.4 V, or between 0.57 and 1.36 V, for example.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sodium heat engine comprising:
   a first stage comprising first high pressure chamber which comprises a first porous anode and a first porous cathode separated by a first sodium conductive solid electrolyte, the first stage configured to provide expansion of a first stream of vaporized sodium from a pressure $P_4$ to a pressure $P_3$, where $P_4$ is greater than $P_3$, by ionizing the vaporized sodium to form sodium ions, the sodium ions being transferable through the first sodium conductive solid electrolyte, the first porous cathode reducing the sodium ions to form a second stream of vaporized sodium;
   a second stage comprising a second low pressure chamber which comprises a second porous anode and a second porous cathode separated by a second sodium conductive solid electrolyte, the second stage operably connected to the first stage, and configured to provide expansion of the second stream of vaporized sodium from a pressure $P_2$ to a pressure $P_1$, where $P_2$ is greater than $P_1$, by ionizing the vaporized sodium to form sodium ions, the sodium ions being transferable through the second sodium conductive solid electrolyte, the second porous cathode reducing the sodium ions to form a third stream of vaporized sodium; and
   an electrical circuit operatively connecting the first porous anode and the second porous cathode with an electrical load wherein the first sodium conductive solid electrolyte comprises a β"-alumina electrolyte.

2. The sodium heat engine of claim 1, wherein the β"-alumina electrolyte is selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

3. The sodium heat engine of claim 1, wherein the β"-alumina electrolyte comprises a sodium ion conductive solid electrolyte of the formula $Na_5LiAl_{32}O_{51}$.

4. The sodium heat engine of claim 1, wherein the pressure $P_4$ is from about 160,000 Pa to about 10,000 Pa.

5. The sodium heat engine of claim 1, wherein the first stage is configured to provide expansion of the sodium at a temperature of about 1100 K to about 1250 K.

6. The sodium heat engine of claim 1, wherein the second sodium conductive solid electrolyte comprises a material selected from the group consisting of:
$Na_3Zr_2Si_2PO_{12}$;
$Na_{1+x}Si_xZr_2P_{3-x}O_{12}$ where x is from 1.6 to 2.4;
Y doped NaSICON of the formula $(Na_{1+x+y}Zr_{2-y}Y_ySi_xP_{3-x}O_{12}, Na_{1+x}Zr_{2-y}Y_ySi_xP_{3-x}O_{12-y})$ where x is 2 and y is 0.12;
Fe-doped NaSICON of the formula $(Na_3Zr_{2/3}Fe_{4/3}P_3O_{12})$;
$Na_5ReSi_4O_{12}$, wherein Re is selected from the group consisting of Y, Gd, Dy, and Nd; and
$Na_4ZrSi_3O_{12}$.

7. The sodium heat engine of claim 6, wherein the second sodium conductive solid electrolyte comprises $Na_3Zr_2Si_2PO_{12}$.

8. The sodium heat engine of claim 6, wherein the second sodium conductive solid electrolyte further comprises a β"-alumina electrolyte.

9. The sodium heat engine of claim 8, wherein the second sodium conductive solid electrolyte comprises a material selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

10. The sodium heat engine of claim 1, wherein the second stage is configured to provide expansion of the sodium at a temperature from about 850 K to about 400 K.

11. The sodium heat engine of claim 1, further comprising a vaporizer to vaporize a flow of molten sodium to form the first stream of vaporized sodium at the pressure $P_4$.

12. The sodium heat engine of claim 11, further comprising a heat source for providing a quantity of heat to the vaporizer.

13. The sodium heat engine of claim 12, wherein the heat source is a concentrating solar power system.

14. The sodium heat engine of claim 12, further comprising a condenser to condense the third stream of vaporized sodium to form a molten stream of sodium.

15. The sodium heat engine of claim 14, further comprising a pump or passive wick positioned between the condenser and the vaporizer, wherein the pump or passive wick allows for flow of molten sodium between the condenser and the vaporizer.

16. The sodium heat engine of claim 1, further comprising a second heat source for providing a quantity of heat to the second stream of vaporized sodium between the first stage and the second stage.

17. The sodium heat engine of claim 1, wherein the Carnot efficiency of the sodium heat engine is at least 0.5.

18. The sodium heat engine of claim 1, wherein the open-circuit electrochemical potential for the sodium heat engine is at least 0.55 V.

19. The sodium heat engine of claim 1, further comprising a third stage comprising a third porous anode and a third porous cathode separated by a third sodium conductive solid electrolyte, the third stage operably connected to the second stage and configured to provide expansion of the third stream of vaporized sodium by ionizing the vaporized sodium to form sodium ions, the sodium ions being transferable through the third sodium conductive solid electrolyte.

20. A method of powering an electrical load using the sodium heat engine of claim 1, the method comprising:
providing a first stream of sodium vapor;
oxidizing the first stream of sodium vapor with the first porous anode to produce sodium ions and electrons and transporting the sodium ions across a first sodium conductive solid electrolyte;
reducing the sodium ions with the first porous cathode to form a second stream of sodium vapor;
oxidizing the second stream of sodium vapor with the second porous anode to produce sodium ions and electrons and transporting the sodium ions across a second sodium conductive solid electrolyte; and
reducing the sodium ions with the second porous cathode to form a third stream of sodium vapor;
wherein the electrical load is part of an electronic circuit operatively connecting the first porous anode and the second porous cathode;
wherein the first sodium conductive solid electrolyte comprises a β"-alumina electrolyte.

21. The method of claim 20, wherein the first sodium conductive solid electrolyte comprises a material selected from the group consisting of: $(Na_2O)_{1-x}11Al_2O_3$ where x is from 0.1 to 0.75; $Na_{1.72}Al_{10.66}Li_{0.30}O_{17}$; and $Na_{1.67}(MgO)_{1.33}10.33Al_2O_3$.

22. The method claim 20, wherein the second sodium conductive solid electrolyte comprises a material selected from the group consisting of:
$Na_3Zr_2Si_2PO_{12}$;
$Na_{1+x}Si_xZr_2P_{3-x}P_{12}$ where x is from 1.6 to 2.4;
Y doped NaSICON of the formula $(Na_{1+x+y}Zr_{2-y}Y_ySi_xP_{3-x}O_{12}, Na_{1+x}Zr_{2-y}Y_ySi_xP_{3-x}O_{12-y})$ where x is 2 and y is 0.12;
Fe-doped NaSICON of the formula $(Na_3Zr_{2/3}Fe_{4/3}P_3O_{12})$;
$Na_5ReSi_4O_{12}$, wherein Re is selected from the group consisting of Y, Gd, Dy, and Nd; and
$Na_4ZrSi_3O_{12}$.

23. The method of claim 20, wherein the second sodium conductive solid electrolyte comprises a β"-alumina electrolyte.

24. A multi-stage sodium heat engine comprising:
a first stage comprising a first high pressure chamber which comprises a first sodium conductive solid electrolyte, the first stage configured to provide expansion of a first stream of vaporized sodium by ionizing the vaporized sodium to form sodium ions, the sodium ions being transferable through the first sodium conductive solid electrolyte;
a second stage comprising a second low pressure chamber which comprises a second sodium conductive solid electrolyte, the second stage configured to provide expansion of a second stream of vaporized sodium by ionizing the vaporized sodium to form sodium ions, the sodium ions being transferable through the second sodium conductive solid electrolyte; and
an electrical circuit operatively connecting the first stage and the second stage with an electrical load, wherein a Carnot efficiency of the multi-stage sodium heat engine is at least 0.5;
wherein the first sodium conductive solid electrolyte comprises a β"-alumina electrolyte.

25. The multi-stage sodium heat engine of claim 24, further comprising a third stage comprising a third sodium conductive solid electrolyte, the third stage configured to provide expansion of a third stream of vaporized sodium by ionizing the vaporized sodium to form sodium ions, the sodium ions being transferable through the third sodium conductive solid electrolyte, wherein the electrical circuit operatively connects the first stage, the second stage, and the third stage with the electrical load.

26. The multi-stage sodium heat engine of claim 24, wherein the second stage receives the second stream of vaporized sodium from the first stage.

27. The multi-stage sodium heat engine of claim 24, wherein the first sodium conductive solid electrolyte comprises a material selected from the group consisting of:
$(Na_2O)_{1-x} 11Al_2O_3$ where x is from 0.1 to 0.75;
$Na_{1.72}Al_{10.66}Li_{0.30}O_{17}$; and $Na_{1.67}(MgO)_{1.33} 10.33Al_2O_3$.

28. The multi-stage sodium heat engine of claim 24, wherein the second sodium conductive solid electrolyte comprises a material selected from the group consisting of:
$Na_3Zr_2Si_2PO_{12}$;
$Na_{1+x}Si_xZr_2P_{3-x}O_{12}$ where x is from 1.6 to 2.4;
Y doped NaSICON of the formula $(Na_{1+x+y}Zr_{2-y}Y_ySi_xP_{3-x}O_{12}, Na_{1+x}Zr_{2-y}Y_ySi_xP_{3-x}O_{12-y})$ where x is 2 and y is 0.12; and
Fe-doped NaSICON of the formula $(Na_3Zr_{2/3}Fe_{4/3}P_3O_{12})$;
$Na_5ReSi_4O_{12}$, wherein Re is selected from the group consisting of Y, Gd, Dy, and Nd; and
$Na_4ZrSi_3O_{12}$.

29. The multi-stage sodium heat engine of claim 24, wherein the β"-alumina electrolyte comprises a sodium ion conductive solid electrolyte of the formula $Na_5LiAl_{32}O_{51}$.

30. The sodium heat engine of claim 1, wherein the first sodium conductive solid electrolyte is different from the second sodium conductive solid electrolyte.

31. The multi-stage sodium heat engine of claim 24, wherein the first sodium conductive solid electrolyte is different from the second sodium conductive solid electrolyte.

32. The multi-stage sodium heat engine of claim 24, further comprising a second heat source for providing a quantity of heat to the second stream of vaporized sodium between the first stage and the second stage.

* * * * *